INVENTOR
George F. Voight.

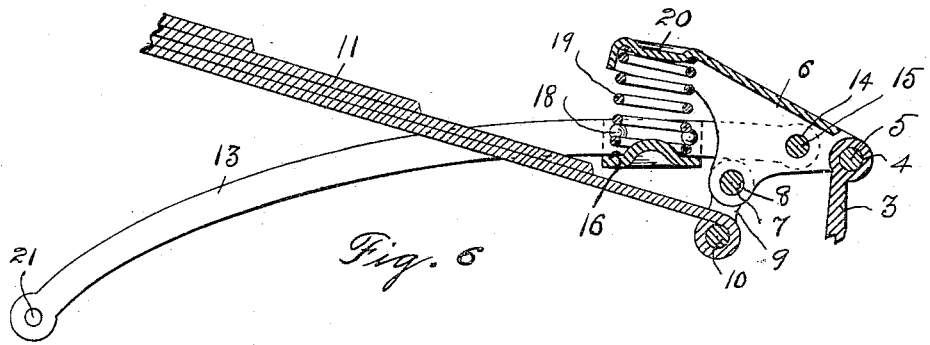
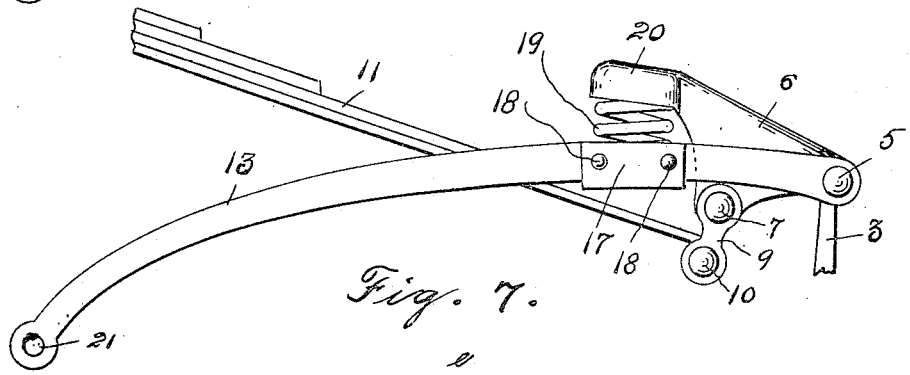
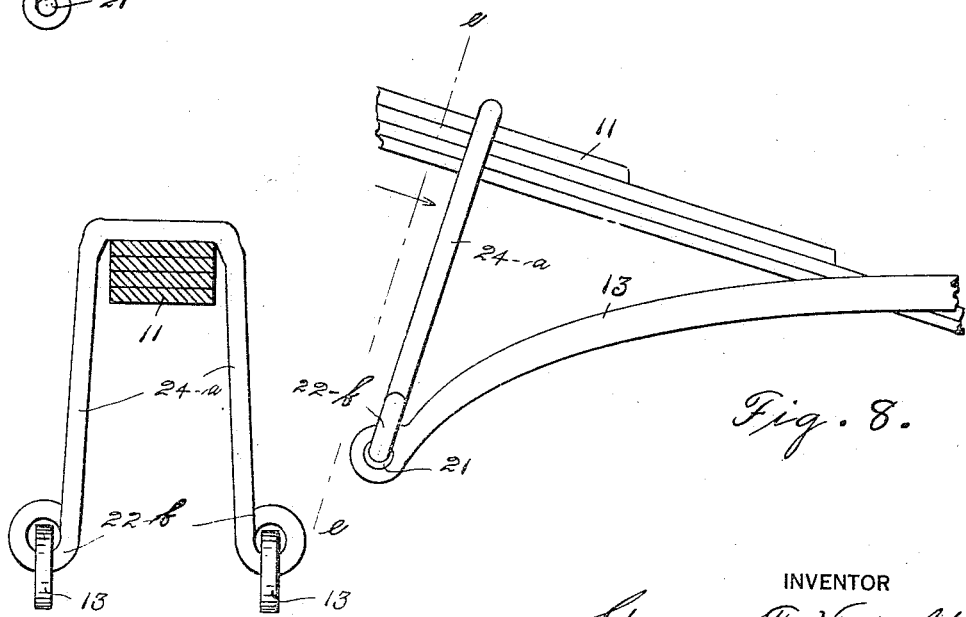

UNITED STATES PATENT OFFICE.

GEORGE F. VOIGHT, OF SAN FRANCISCO, CALIFORNIA.

VEHICLE SHOCK-ABSORBER.

1,294,353.

Specification of Letters Patent. Patented Feb. 11, 1919.

Application filed November 4, 1918. Serial No. 261,100.

*To all whom it may concern:*

Be it known that I, GEORGE F. VOIGHT, a citizen of the United States, and resident of San Francisco, in the county of San Francisco and State of California, have invented new and useful Improvements in Vehicle Shock-Absorbers, of which the following is a specification, reference being had therein to the accompanying drawings.

My invention relates to improvements in vehicle shock absorbers in which oscillatory levers having one end attached to the vehicle's axle and the other end attached to a portion of vehicle approximately vertically movable relatively to the axle, assist the vehicle's principal leaf spring to cushion the vehicle against the unevenness of the road over which it may travel.

An object of my invention is to provide an oscillatory spring hanger having its outer end pivotally supported by the vehicle's axle and having a section inwardly from its outer end coupled up with the outer end of the principal leaf spring of the vehicle, co-operating with a lever or levers having their outer ends pivotally connected to the hanger and their inner ends movably supported by a portion of the vehicle movable relatively to the axle as the frame or the principal leaf spring inwardly at a distance from its outer end, whereby the inner end of the hanger may move upwardly and downwardly relatively to a registering section of the levers which it over-hangs.

Another object of the invention is to provide a compression spring adapted to be confined between the inner or free end of the hanger and a registering section of the lever or levers, whereby said inner or free end of the hanger may move upwardly and downwardly with and against the tension of said compression spring and whereby said compression spring may normally support said inner end of the hanger a distance above the lever or levers.

With the foregoing and other objects and purposes in view which will appear as the description proceeds, the invention resides in the combination and arrangement of parts and in the details of construction hereinafter described and claimed, it being understood that changes in the precise embodiment of the invention as herein disclosed can be made within the scope of what is claimed without departing from the spirit of the invention.

In the drawings—

Fig. 6 is a sectional view in elevation, also showing a portion of the vehicle's principal leaf spring in section.

Fig. 7 is a side view of the present invention in a somewhat modified form.

Fig. 8 is a fragmentary view of the invention in a modified form.

Fig. 9 is a view of a portion of the invention in its modified form, on line *e—e*, Fig. 8.

Figure 1:
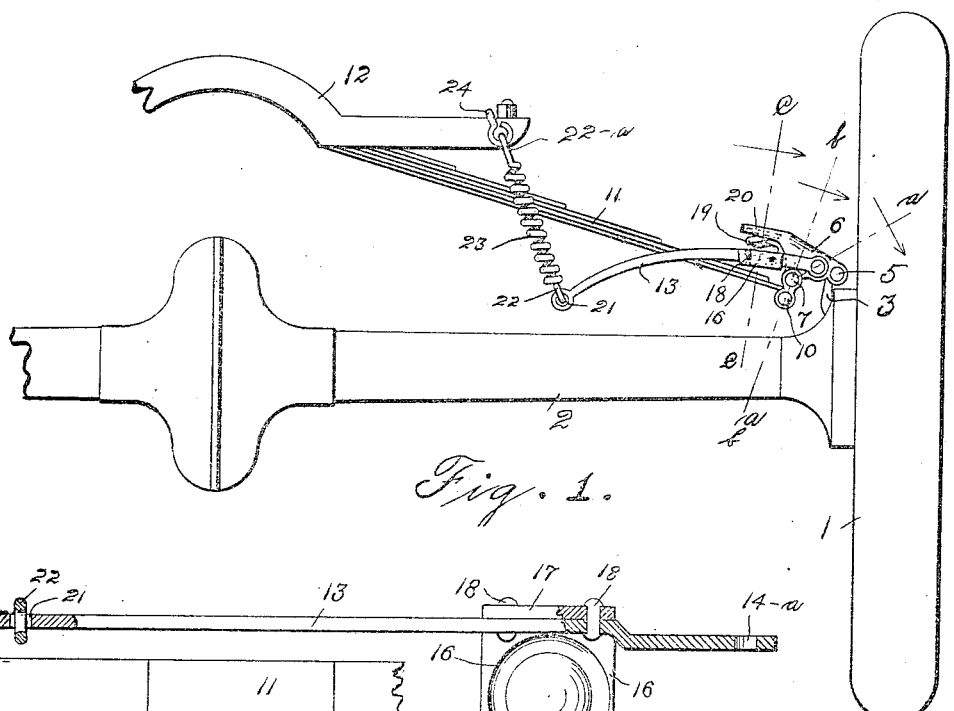
Figure 1 is a rear-end elevation of a portion of the right-hand side of a vehicle and my invention installed thereon.
Figure 2:
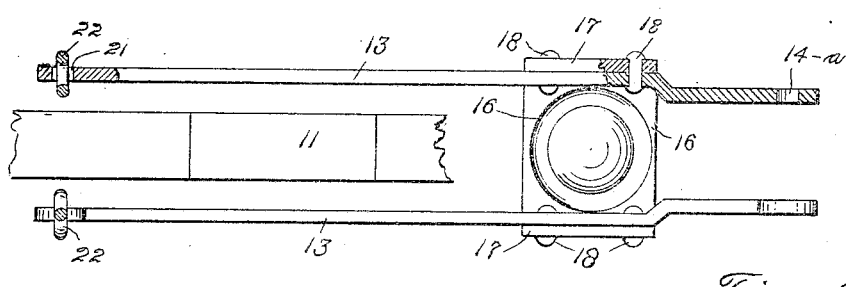
Fig. 2 is a top or plan view of the levers and compression spring seat, portions being in section.
Figure 5:
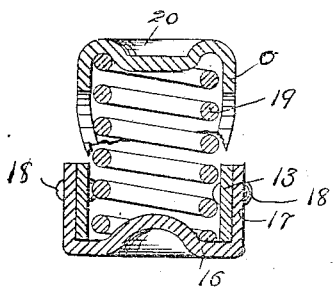
Fig. 5 is a sectional view on line *c—c*, Fig. 1.
Figure 3:
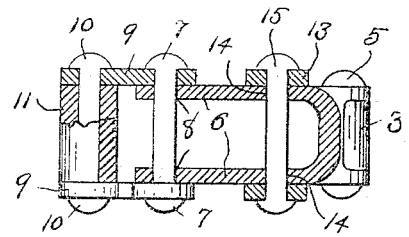
Fig. 3 is a part sectional view on line *a—a*, Fig. 1.
Figure 4:
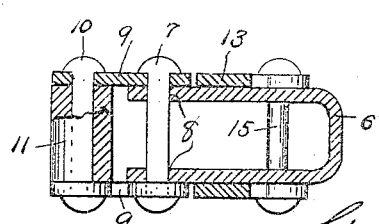
Fig. 4 is a part sectional view on line *b—b*, Fig. 1.

While I have shown my invention only as applied to the rear right-hand side of a vehicle, it is as applicable to the rear left-hand side as well as to the right-hand side, and to the front end as well as to the rear end of any vehicle.

Note: Throughout the specifications and claims, the terms "outer" and "outwardly" will indicate respectively—farthest away from—and—in a direction away from—the median vertical plane extending longitudinally through the vehicle, and the terms "inner" and "inwardly" will indicate respectively—nearest to—and—in a direction toward—said plane.

Referring now to the drawings, wherein like numerals of reference indicate like parts throughout the several views,—

The numeral 1 designates a vehicle road wheel supporting one end of an axle 2 provided adjacent its outer end with a rigid upwardly extending bracket 3 having a transversely extending opening 4 through its upper end.

5 is a pivot pin rotatably fitted in the opening 4 and having its outer ends secured to the outer bifurcated end of a spring hanger 6 rotatably supporting at a distance inwardly from its outer pivoted end a pivot pin 7 in openings 8.

The outer ends of the pivot pin 7 support the upper ends of a pair of laterally spaced apart links 9 flexibly coupled at their lower ends to the outer end of the vehicle's principal leaf spring 11 by means of a pivot pin 10.

13 designates a pair of laterally spaced apart levers disposed on opposite sides of the spring 11 and hanger 6 and provided with apertures 14ᵃ at their outer ends and apertures 21 at their inner ends.

In the preferred form of the invention, as plainly illustrated in Figs. 1 and 6 of the drawings, I resiliently support the inner ends of the levers 13 by means of extensile coil springs 23 which I provide with lower hooked ends 22 engaging the apertures 21 and upper hooked ends 22ᵃ engaging and secured to a yoke 24 adapted to straddle a section of the frame 12 from the upper side thereof. However, in the modified form of the invention, as illustrated in Figs. 8 and 9, I substitute for the spring 23 and yoke 24 a nonresilient yoke 24ᵃ seated upon an intermediate section of the spring 11 and having its free ends, which are disposed at opposite sides of said spring, terminating in hook-eyes 22ᵇ engaging with the apertures 21 in the levers 13. It is obvious, of course, that the coil spring 23 may be connected to the leaf spring 11 instead with the frame as shown, and that the yoke can be connected to the frame 12 instead of to the spring 11, if so desired.

Referring again to the preferred form of the invention, as best shown in the Figs. 1 and 6, 14 designates apertures extending transversely through the hanger 6 intermediate its ends, in which is fitted, preferably rotatably, a pivot pin 15 to which are pivoted the outer ends of the levers 13.

In the modified form as illustrated in Fig. 7, it will be seen that I have eliminated the pivot pin 15 and have secured the outer ends of the levers 13 directly to the outer ends of the pivot pin 5.

The objects of my invention are about equally well served whether the outer ends of the levers 13 are pivoted to the hanger 6 as illustrated in the said preferred form or as illustrated and described in the modified form.

16 is a spring seat disposed upon the lower side of the levers 13 and provided with up-turned ends 17 adapted to be fixedly secured to the outer sides of said levers by means of rivets 18.

Between said spring seat 16 and the free end 20 of the hanger 6, is confined a coil compression spring 19. The spring 19 being adapted to normally resiliently support the inner or free end of the hanger 6 relatively to the levers 13.

From the foregoing description of the invention, it is obvious that the inner or free end of the hanger 6 and the outer or free end of the leaf spring 11 may normally be resiliently supported by the spring 19, and it is further obvious that in case of the abnormal rebound of the spring 11 that said free end may move upwardly relatively to intermediate sections of the levers 13.

The levers 13, spring seat 16 and the hanger 6 can be readily pressed out of sheet metal. However, if preferred, these parts may be forged or cast. The levers and spring seat may be cast integral, if desired.

I claim:

1. In combination, a rigid spring hanger having its outer end fulcrumed upon a vehicle axle, a lever having its inner end movably supported, sections of said hanger and lever being pivotally connected together, and a spiral compression spring confined between sections of said hanger and lever movable to and from each other.

2. In combination, a rigid spring hanger pivotally supported at its outer end by the vehicle axle, a rigid lever having its inner end supported by a portion of the vehicle subject to rebound, sections of said hanger and lever being pivotally connected together, and a coil compression spring confined between other sections of said hanger and lever.

3. In combination, an oscillatory spring hanger arranged to be pivotally supported at its outer end by the axle of the vehicle, a lever arranged to have its inner end movably supported by a portion of the vehicle subject to rebound, the outer end of said lever being pivotally connected to said hanger, a spiral compression spring confined between portions of said hanger and lever movable to and from each other, and a connection between one end of the vehicle's leaf spring and said hanger.

4. In combination, an oscillatory spring hanger pivoted at its outer end to the axle of the vehicle, a lever movably supported at its inner end by a portion of the vehicle subject to rebound, a pivotal connection between the outer end of the lever and said hanger, a spiral spring seated upon the lever intermediate its ends, a connection between said hanger adjacent its free end and said spiral spring, and a connection between said hanger and one end of the vehicle's leaf spring.

5. In combination, a rigid oscillatory spring hanger pivotally connected at its outer end to the axle of the vehicle, a rigid oscillatory lever movably supported at its inner end by a portion of the vehicle movable relatively to said axle, a pivotal connection between the outer end of the lever and said hanger, a spiral compression spring confined between portions of said hanger and lever movable to and from each other, and a connection between one end of the vehicle's leaf spring and said hanger.

6. In a device of the character described, a spring hanger pivoted at its outer end to the axle of the vehicle, a lever pivoted at its outer end to said hanger and movably supported at its inner end by a portion of the vehicle movable relatively to said axle, an arm on said hanger, and a spiral compression spring confined between the free end of said arm and a portion of said lever.

7. In a device of the character described, a spring hanger provided with an outer bifurcated end, a pivotal connection between the free ends of the arm forming said bifurcated end and the axle of the vehicle, a lever having its outer end pivotally connected to said hanger and its inner end movably supported, and a spiral compression spring confined between portions of said hanger and lever movable relatively to each other.

8. In a device of the character described, a spring hanger provided with an outer bifurcated end pivotally supported by the axle of the vehicle, a lever having its outer end pivotally connected to said hanger and having a relatively movable support for its inner end, a portion of said hanger projecting above said lever, and a spiral compression spring confined between the free end of said portion and said lever.

9. In a device of the character described, a rigid spring hanger having its outer end pivotally supported by the axle of the vehicle, a lever having its outer end pivotally connected to said hanger, a connection between the inner end of said lever and a portion of the vehicle subject to rebound, a portion of the free end of said hanger being disposed above said lever, a spiral compression spring confined between the free end of said portion and a portion of said lever, and a pivotal connection between one end of the vehicle's leaf spring and said hanger.

10. In a device of the character described, a rigid spring hanger having its outer end pivotally supported by the axle of the vehicle, a lever having its outer end pivotally connected to said hanger adjacent its outer end, a relatively movable support for the inner end of said lever, and a resilient connection between portions of said hanger and lever movable to and from each other.

11. In a device of the character described, a rigid spring hanger having its outer end pivotally attached to the axle of the vehicle, a lever having its outer end pivotally connected to said hanger and having a relatively movable support for its inner end, a portion of the free end of said hanger being movable to and from a registering portion of said lever, and means whereby said portion of the free end of said hanger may normally be held free from said registering portion of the lever.

12. In a device of the character described, a spring hanger, a pivotal support for its outer end, a lever, a pivotal connection between its outer end and said hanger, a support for the inner end of said lever, and resilient means connecting portions of said hanger and lever together, the arrangements being such that the free end of said hanger may move downwardly against the tension of said means.

13. The combination with a vehicle having an axle and a leaf spring disposed above said axle and extending in a general direction therewith, of an oscillatory spring hanger pivoted at its outer end to said axle, a lever having its outer end pivotally connected to said hanger and its inner end supported by a portion of said vehicle movable relatively to said axle, a spring seated upon the lever intermediate its ends, a projection on the free end of said hanger engaging one end of said last named spring, and a connection between one end of said leaf spring and said hanger.

14. The combination with a vehicle having an axle and a leaf spring disposed above said axle and extending in a general direction therewith, of a spring hanger pivoted at its outer end to said axle, a lever pivotally connected at its outer end to said hanger and having a relatively movable support for its inner end, a projection on said hanger adjacent its free end, a portion of said projection being spaced apart from a registering portion of said lever, a spiral spring confined between said registering portions whereby said portions may move toward each other against the tension of said spiral spring, and a link connection between one end of said leaf spring and said hanger.

15. The combination with a vehicle having an axle and a leaf spring disposed above said axle, of a rigid spring hanger pivotally attached at its outer end to said axle, a lever having its outer end pivotally attached to said hanger and having its inner end supported by a portion of the vehicle subject to rebound, portions of said hanger projecting above and below said lever, a resilient connection between one of said portions and said lever intermediate the ends of the latter, and a rigid link connection between the other of said portions and one end of said leaf spring.

16. The combination with a vehicle having an axle and a leaf spring disposed above said axle and extending in a general direction therewith, of a spring hanger pivoted at its outer end to said axle, a spiral spring for supporting the free end of said hanger, a link connection between said hanger intermediate its ends and one end of said leaf spring, and means for supporting said spiral spring, said means being movable relatively to said leaf spring and having its outer end pivotally supported independently of said leaf spring and its inner end supported by a portion of the vehicle movable relatively to said axle.

17. The combination with a vehicle having an axle and a leaf spring disposed above said axle and extending in a general direction therewith, of a spring hanger pivoted at its outer end to said axle, a spiral compression spring for supporting the inner end of said hanger, a pivotal connection between said hanger and one end of said leaf spring, means for supporting said spiral compression spring, a support for the outer end of said means, the inner end of said means projecting below the axis of said leaf spring, and an element having its upper end supported by a portion of the vehicle subject to rebound and its lower end connected to said inner end of said means for supporting it.

18. The combination with a vehicle having an axle and a leaf spring disposed above said axle and extending in a general direction therewith, of a spring hanger pivotally supported at its outer end by said axle, means having its outer end pivotally connected to said hanger, portions of said means being disposed on each side of said leaf spring, a connection between the free ends of said portions and a portion of the vehicle subject to rebound, a projection on said hanger being disposed above the axis of said means, a spiral spring connection between the free end of said projection and said means intermediate its ends, and a connection between said spiral spring and one end of said leaf spring whereby said end may move downwardly against the tension of said spiral spring.

19. The combination with a vehicle having an axle and a leaf spring disposed above said axle and extending in a general direction therewith, of a rigid spring hanger having its outer end pivotally attached to said axle, a lever having its outer end pivotally connected to said hanger and having its inner end supported by a portion of the vehicle movable relatively to said axle, a spiral compression spring carried by said lever intermediate its ends, said hanger having a projection, the free end of said projection being seated upon one end of said spiral spring, and a connection between one end of said leaf spring and said spiral spring whereby said end of the leaf spring may move downwardly by compressing said spiral spring.

20. In combination, an axle, a leaf spring disposed above said axle and extending in a general direction therewith, an oscillatory spring hanger having its outer end pivotally supported by said axle, a lever having its inner end supported by a portion of the vehicle subject to rebound, a pivotal connection between one section of the lever and one section of said hanger, a coil compression spring confined between other sections of said hanger and lever whereby the inner end of said hanger may move downwardly relatively to said axle when said coil spring is compressed, and a link connection between one end of said leaf spring and said hanger.

21. The combination with a vehicle having an axle and a leaf spring disposed above said axle and extending in a general direction therewith, of an oscillatory spring hanger having its outer end pivotally supported by said axle, a lever having its inner end supported by a portion of the vehicle movable relatively to said axle, a pivotal connection between the outer end of said lever and said hanger, a spring confined between the inner end of said hanger and said lever intermediate the ends of the latter, and a link connection between said spring and one end of said leaf spring.

22. The combination with a vehicle having an axle and a leaf spring disposed above said axle and extending in a general direction therewith, of an oscillatory spring hanger having its outer end pivotally supported by said axle, a lever having its inner end supported movably relatively to said axle, a coil compression spring seated upon the lever intermediate its ends, a pivotal connection between the outer end of said lever and said hanger, a connection between the inner end of said hanger and said compression spring whereby the latter may resiliently support the former, and a connection between one end of said leaf spring and said hanger.

23. The combination, with a vehicle having an axle and a leaf spring disposed above said axle and extending in a general direction therewith, of means pivotally connected at its outer end to said axle, a lever having its inner end movably supported relatively to said axle, a pivotal connection between said means and said lever, a coil compression spring having its lower truncated end supported by said lever intermediate the ends thereof, a connection between the upper end of said compression spring and the inner or free end of said means, and a link connection between one end of said leaf spring and said means.

24. The combination with a vehicle having an axle and a leaf spring disposed above said axle and extending in a general direction therewith, of an oscillatory spring hanger having its outer end pivotally supported by said axle, a pair of levers having their inner ends supported by a portion of the vehicle movable relatively to said axle, a coil compression spring having its lower truncated end seated upon said levers intermediate their ends, a pivotal connection between the inner ends of said levers and said hanger adjacent the outer end of the latter, a connection between the inner end of said hanger and said compression spring whereby the latter may resiliently support the former, and a pivotal connection between one end of said leaf spring and said hanger intermediate its ends.

25. A vehicle shock absorber comprising an oscillatory spring hanger having its outer end pivotally connected to the vehicle's axle, the inner end of said hanger over-hanging the outer end of the vehicle's leaf spring, a pair of spaced apart levers disposed on opposite sides of said leaf spring, a connection between the inner ends of said levers and a portion of the vehicle subject to rebound, a pivotal connection between the outer ends of said levers and said hanger, a rigid connection between said levers intermediate their ends, a coil compression spring carried by said levers between their ends, a connection between the free end of said hanger and said compression spring whereby the latter may resiliently support the former, and means for supporting said outer end of the leaf spring by said hanger.

In evidence of the foregoing being my own, I have hereunto signed my name this 28th day of October, 1918.

GEORGE F. VOIGHT.